United States Patent [19]

Nakamats

[11] Patent Number: 4,634,343
[45] Date of Patent: Jan. 6, 1987

[54] APPARATUS FOR CONVERTING RADIANT ENERGY SUCH AS LIGHT OR HEAT DIRECTLY INTO TURNING FORCE

[76] Inventor: Yoshiro Nakamats, 1-10-1105, Minami Aoyama 5-chome, Minato-ku, Tokyo, Japan

[21] Appl. No.: 570,130

[22] Filed: Jan. 12, 1984

[30] Foreign Application Priority Data

Jan. 14, 1983 [JP] Japan .................................. 58-4687

[51] Int. Cl.⁴ .......................... F03G 7/02; H02N 6/00; H02K 41/02; B60K 1/00
[52] U.S. Cl. ...................................... 416/3; 180/65.2; 180/65.3; 310/12; 310/49 R; 310/306
[58] Field of Search ..................... 310/68 R, 153, 156, 310/12-14, 306, 49 R; 180/65.2, 65.3, 65.5; 416/3

[56] References Cited

U.S. PATENT DOCUMENTS

| | | | |
|---|---|---|---|
| 3,296,469 | 1/1967 | Hall | 310/306 X |
| 3,445,740 | 5/1969 | Merkl | 310/49 R X |
| 4,327,316 | 4/1982 | Fujikobo et al. | 180/65.3 X |
| 4,328,417 | 5/1982 | Himes | 310/306 X |
| 4,357,568 | 11/1982 | Hore | 310/49 R X |
| 4,498,551 | 2/1985 | Arbisi | 180/65.5 |

FOREIGN PATENT DOCUMENTS

| | | | |
|---|---|---|---|
| 2726948 | 1/1979 | Fed. Rep. of Germany | 310/68 R |
| 2390 | 1/1980 | Japan | 310/156 |

Primary Examiner—Tony M. Argenbright
Attorney, Agent, or Firm—Jordan and Hamburg

[57] ABSTRACT

An apparatus for converting radiant energy directly into a turning force includes a rotor, a stator, a photoelectric converters on one of the rotor and stator for convering a radiant energy such as light or heat into an electric energy, coils on the one of the rotor and stator and which is adapted to produce a magnetic field when it receives the electric energy due to the radiant energy without need of any brush, and magnets on the other of the rotor and stator for providing a turning force in response to the magnetic fields in the coils.

19 Claims, 36 Drawing Figures

APPARATUS FOR CONVERTING RADIANT ENERGY SUCH AS LIGHT OR HEAT DIRECTLY INTO TURNING FORCE

BACKGROUND OF THE INVENTION

The present invention relates to an apparatus for converting a radiant energy such as light or heat directly into a turning force.

Electric motors are broardly utilized in various applications. Recently, there have been developed electric motors energized by the solar energy through solar cells or photoelectric converters. In any event, all the prior art electric motors require brushes or DC-AC convertors. Therefore, the electric motor is of a heavy weight, complicated in construction and hard to be handled.

SUMMARY OF THE INVENTION

It is therefore an object of the present invention to provide a new and unique apparatus for converting a radiant energy such as light or heat directly into a turning force without need of any brush.

In accordance with the present invention, the apparatus comprises a rotor, a stator, means on one of the rotor and stator for converting a radiant energy such as light or heat into an electric energy, coil means on the one of the rotor and stator and which is adapted to produce a magnetic field when it receives the electric energy without need of any brush means, and magnet means on the other of the rotor and stator for providing a turning force in response to the magnetic field in the coil means.

BRIEF DESCRIPTION OF THE DRAWINGS

Other objects and features of the present invention will be apparent from reading the following description in connection with the accompanying drawings, in which.

DESCRIPTION OF PREFERRED EMBODIMENT

Figure 1:
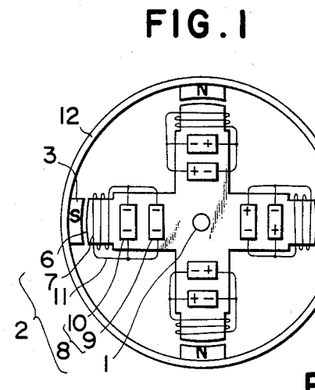
FIG. 1 is a plan view of the first embodiment of the present invention with a mask being removed.
Figure 2:
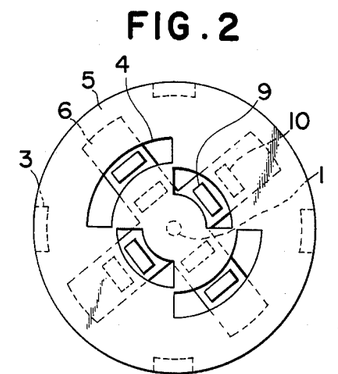
FIG. 2 is a plan view of the first embodiment with the mask being mounted thereon.
Figure 3:
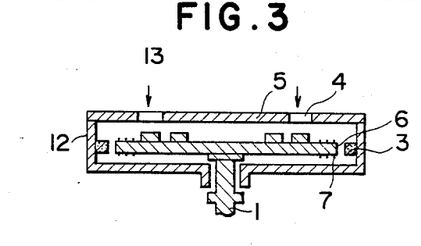
FIG. 3 is a cross-sectional view of the first embodiment, taken along its center.

Referring to FIGS. 1 to 3, the illustrated apparatus comprises a rotor 2 supported by a rotatable shaft 1 and a cylindrical casing 12 in which the rotor 2 is positioned. The casing 12 includes four permanent magnets 3 located on the inner periphery thereof and spaced away from one another circumferentially at equi-distance. The open top of the casing 12 is covered by a mask 5 including windows 4 formed therein.

The rotor 2 includes four arms 6 on each of which a coil 7 is wound in the same direction as those of the coils on the other converting means 8 adapted to receive light through the windows 4 of the mask 5. The photoelectric converting means 8 consists of a pair of inner and outer elements 9 and 10 such as silicon solar cells. The inner and outer elements have polarities opposite to each other, and are connected with the corresponding coil 7 by conductors 11.

The four permanent magnets 3 have polarities alternately different from each other to form a stator and are spaced away from the path of the tips of the arms in the rotor 2.

The windows 4 on the rotor 2 comprises a pair of sector-shaped windows for exposing the inside elements 9 of the photoelectric means 8 and another pair of sector-shaped windows for exposing the outside elements 10 of the same means. It a light is incident on the mask 5 as shown by arrow 13, the elements 9 produce electric current to creat magnetic fields on the corresponding coils 7, for example, as in FIG. 2. Such magnetic fields cause the rotor to move relative to the stator 3 under the attraction or repulsion force in the stator 3. The electric current supplied to the coils 7 is changed in direction at each quarter revolution of the rotor 2 to thereby vary the magnetic fields on the arms 6 with respect to their polarities. Thus, the rotor 2 continues to rotate to provide the torque to the shaft 1.

Figure 4:
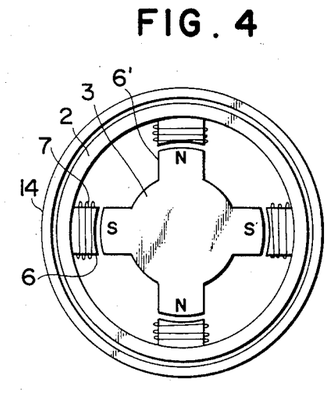
FIG. 4 is a view similar to FIG. 1, showing the second embodiment of the present invention.
Figure 5:
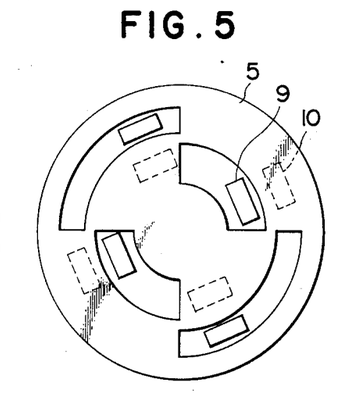
FIG. 5 is a view similar to FIG. 2, showing the second embodiment of the present invention.
Figure 6:
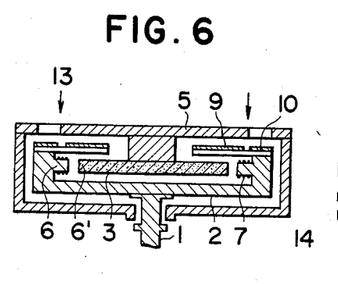
FIG. 6 is a cross-sectional view of the second embodiment of the present invention.

In the second embodiment shown in FIGS. 4, 5 and 6, a stator 3 is positioned within a casing 14 at its center. The stator 3 has four arms 6' angularly spaced away from one another at equi-distance and which is made of permanent magnet material. A rotor 2 surrounds the stator 3 and supported by a rotatable shaft 1. The rotor 2 carries coils 7 and photoelectric converter elements 9 and 10 as in the first embodiment. The open top of the casing 14 is covered by a mask 5 having windows as in the first embodiment. The stator 3 is fixed to the mask 5.

Figure 7:
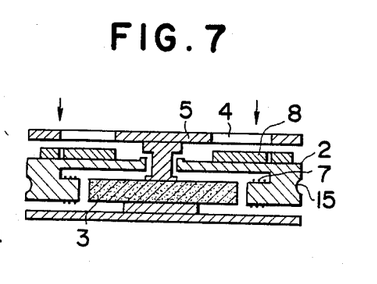
FIG. 7 is a cross-sectional view of the third embodiment of the present invention.

Referrring to FIG. 7, the third embodiment shown herein comprises a stator 3 having permanent magnet arms as in the first and second embodiments and a vertical shaft supporting a mask 5 which has windows 4 as in the previous embodiments. This shaft rotatably supports a rotor 2 surrounding the stator and including coils 7 and photoelectric means 8. The rotor 2 has a circumferential groove 15 formed therein at the outer periphery so that the rotor 2 will be used as a drive pulley.

Figure 8:
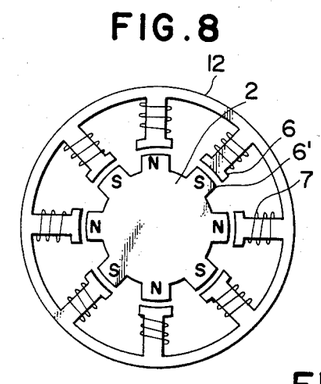
FIG. 8 is a view similar to FIG. 1, showing the fourth embodiment of the present invention.
Figure 9:
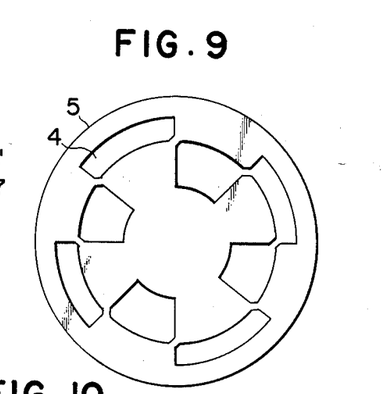
FIG. 9 is a view similar to FIG. 2, showing the fourth embodiment of the present invention.
Figure 10:
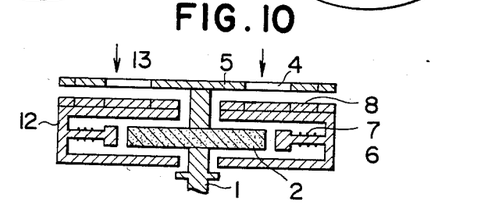
FIG. 10 is a cross-sectional view of the fourth embodiment.

FIGS. 8, 9 and 10 show the fourth embodiment of the present invention which comprises a central rotor 2 supported by a rotatable shaft 1 and including permanent magnet arms 6' as in the previous embodiments. The top of the shaft 1 supports a mask 5 and rotor 2 can be rotated as a unit. The rotor 2 is surrounded by a stator 12 supporting photoelectric converter means 8 and coils 7 in the same manner as those of the previous embodiments.

Figure 11:
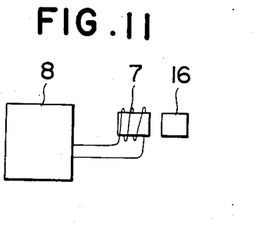
FIG. 11 is a plan view of the fifth embodiment of the present invention.
Figure 12:
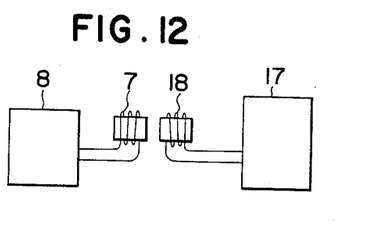
FIG. 12 is a plan view of the sixth embodiment of the present invention.

In either of the previously described embodiments, the rotor can be rotated under the reaction of the magnetic fields obtained when the coils 7 are energized by the outputs of the photoelectric converters 8 with the permanent magnets 16, as shown in FIG. 11. As shown in FIG. 12, however, the permanent magnets 16 may be replaced by electromagnetic means provided by energising a coil 18 with the output of the element 17 when it is irradiated with light.

Figure 13:
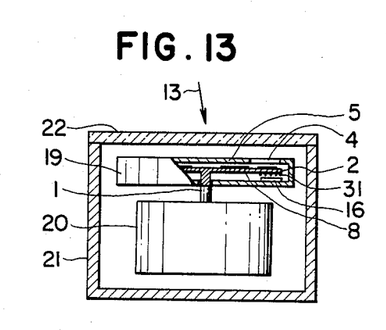
FIG. 13 is a side view, partially broken, showing the seventh embodiment of the present invention.

FIG. 13 shows such a construction that can decrease the resistance of the rotor upon rotating and accumulate the turning energy. In this embodiment, a motor 19 having the same construction as those of the previous embodiments includes a rotating shaft 1 which is connected at the bottom end with a fly wheel 20. This assembly is contained in a box 21 which is evacuated to vacuum. The open top of the box 21 is sealingly covered by a transparent covering 22. Thus, the motor 19 can received light 13 through the transparent covering 22 to rotate in the manner as described hereinbefore.

In the above-mentioned embodiments, the light irradiating the mask 5 may be condensed on a specific area such as window 4 through mirror or lens means.

Figure 14:
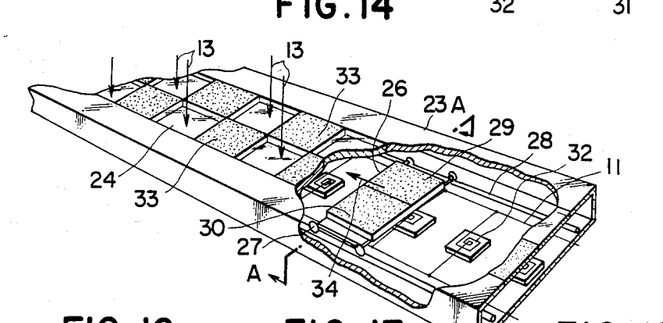
FIG. 14 is a perspective view of the eighth embodiment of the present invention.
Figure 15:
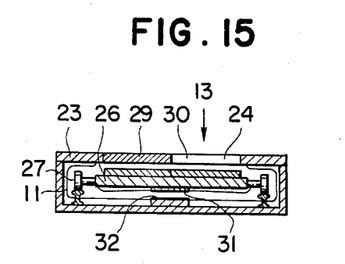
FIG. 15 is a cross-sectional view of the eighth embodiment, taken along a line A—A in FIG. 14.

FIGS. 14 and 15 show the eighth embodiment of the present invention which is applied to a linear motor. The illustrated embodiment comprises a travelling body 26 corresponding to the above-mentioned rotor and an elongated casing 23 of rectangular cross-section. The casing 23 includes, at its top, two longitudinal rows of light-receiving areas each of which rows includes a plurality of windows 24 covered by glass sheet and spaced away from one another, and photoelectric converters 33 located between each adjacent windows. The casing 23 also includes rails 28 mounted on the bottom thereof, on which the travelling body 26 will run through wheels 27.

The travelling body 26 includes a pair of photoelectric elements 29 and 30 disposed side by side on the top thereof to align with the respective rows of light-receiving area. These elements have polarities different from each other. The travelling body 26 further includes a print coil 31 formed thereon at the underside for producing a magnetic field when it receives the outputs of the above elements 29 and 30.

The casing 23 includes a plurality of print coils 32 located on the bottom thereof along a line coincide with the path of the print coil 31 on the travelling body 26. The print coils 32 are spaced away from one another along said line. These print coils 32 is always energized by the total output of the photoelectric converter elements 33 to produce magnetic fields.

When the travelling body 26 is moved, the photoelectric elements 29 and 30 are alternately exposed to light through the alternate windows 24. Since these elements 29 and 30 have the opposite polarlities, N and S poles of the magnetic fields will alternately be produced in the print coil 31 on the travelling body 26. In this connection, the print coils 32 on the casing 23 are so disposed that N and S poles of the magnetic fields are alternately present thereon.

In such an arrangement, the travelling body 26 can be run in the direction of arrow 34 in FIG. 14.

The travelling body 26 may pull any lorry on the rails 28. Furthermore, the print coils 32 may be replaced by permanent magnets so as to cooperate with the print coil 31 on the travelling body 26.

The print coils may be prepared by etching printed circuit boards (PCB).

Figure 16:
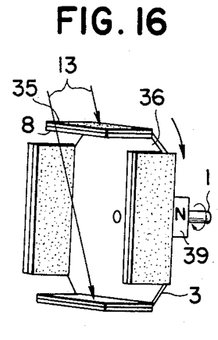
FIG. 16 is a front perspective view of the ninth embodiment of the present invention.
Figure 17:
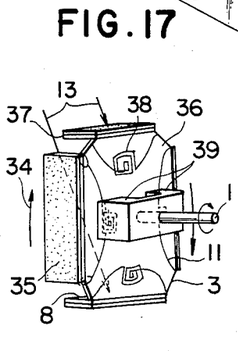
FIG. 17 is a back perspective view of the ninth embodiment.

FIGS. 16 and 17 show the ninth embodiment of the present invention which comprises a horizontal rotating shaft 1 and photoelectric converter elements 8 and 35 vertically disposed.

The ninth embodiment also includes a vertical disc 36 integrally secured to the shaft 1. The disc 36 has plates 37 axially extending from one of the opposite sides and each of which includes a photoelectric element 8 located thereon inside and another photoelectric element 35 disposed thereon outside. The opposite side of the disc 36 includes print coils 38 located thereon for producing magnetic fields under the action of the outputs from the elements 8 and 35. A permanent magnet 39 is fixedly located adjacent the opposite side of the disc 36 to co-operate with the print coils 38 thereon.

Each of the print coils 38 is adapted to produce magnetic fields different in polarity from each other by separately receiving the respective outputs of the inner and outer elements 8 and 35 on the plate 37. If a light 13 is incident on the disc 36, the rotor 3 is rotated to expose either of the opposite sides of each plate 37 to the light such that the elements 8 and 35 will alternately be exposed to the light. Thus, the magnetic field on each of the coils 38 will be changed in polarity to rotate the rotor 3 in the direction of arrow 34 shown in FIG. 17.

Figure 18:
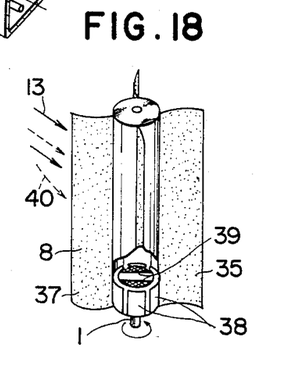
FIG. 18 is a perspective view of the tenth embodiment of the present invention.

The tenth embodiment of the present invention shown in FIG. 18 comprises a vertical rotating shaft 1 and radially extending plates 37 on which the same photoelectric elements as those in the previous embodiments are located. The tenth embodiment may be operated by both the sunlight and wind force.

If the sunlight 13 is incident on either of the opposite sides of each plate 37, the rotor is rotated in the same manner as previously described. If there is a wind, the wind force is added to the rotation of the rotor due to the sunlight. Thus, natural energies can sufficiently be utilized in this embodiment.

Referring to FIGS. 19 to 24, the present invention is applied to a ventilating fan which can be rotated when it receives a light.

Figure 19:
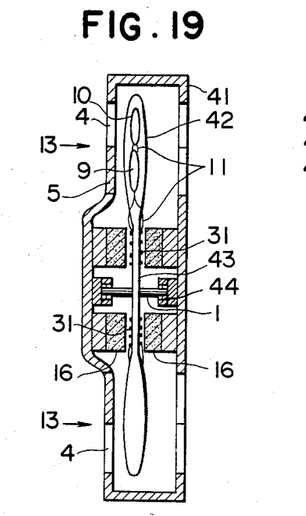
FIG. 19 is a cross-sectional view of the eleventh embodiment of the present invention.
Figure 20:
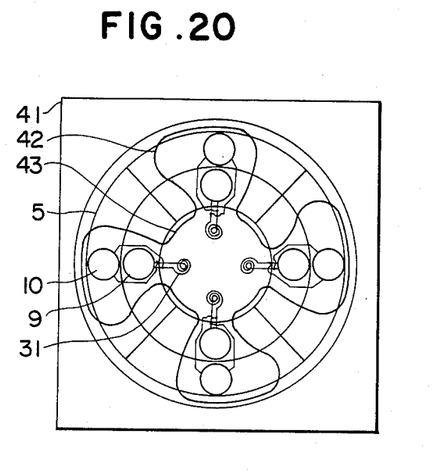
FIG. 20 is a front elevational view of the eleventh embodiment.

The ventilating apparatus shown in FIGS. 19 and 20 comprises a box-like frame 41 and a fan 42 located within the frame 41 and supported at its central section 43 by a rotating shaft 1 which is rotatably supported by bearings 44 mounted on the frame 41. The fan 42 includes photoelectric converting elements 9 and 10 disposed thereon, these elements being similar to those in the previous embodiments. The central section 43 of the fan 42 has print coils 31 formed thereon which are electrically connected with the respective elements 9 and 10. The photoelectric converting elements 9 and 10 have different polarities from each other.

The frame 41 includes permanent magnets 16 each of which is disposed opposed to the print coils 31 on the fan 42. The frame 41 also functions as a yoke for the permanent magnets 16.

The frame 41 also includes windows 4 for alternately exposing the photoelectric elements 9 and 10 on the fan 42.

Figure 21:
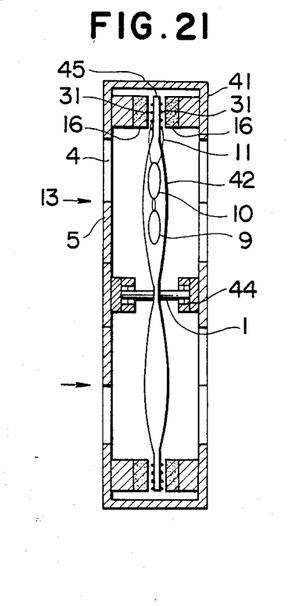
FIG. 21 is a cross-sectional view of the twelfth embodiment of the present invention.
Figure 22:
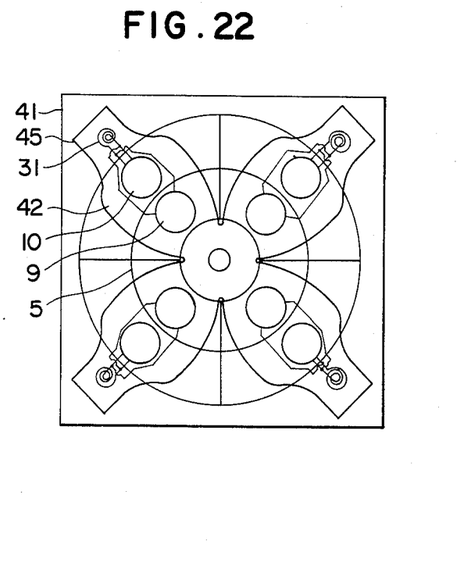
FIG. 22 is a front elevational view of the twelfth embodiment of the present invention.

In the twelveth embodiment shown in FIGS. 21 and 22, the frame 41 comprises permanent magnets 16 located at four corners. The fan 42 includes four plates 45 at the tips of the baldes on which the print coils 31 are disposed opposed to the permanent magnets 16 on the frame 41. The fan 42 also includes photoelectric converting elements 9 and 10 electrically connected with the respective permanents coils 31 in the same manner as previously described. Thus, the fan 42 can be rotated under thre reaction of the magnets 16 with the coils 31 as previously described.

Figure 23:
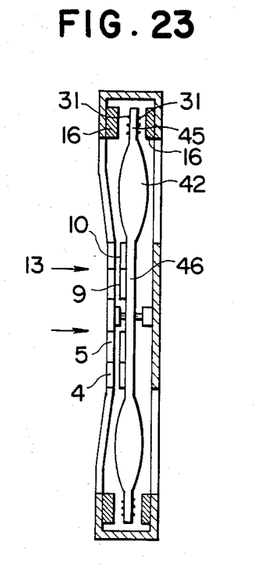
FIG. 23 is a cross-sectional view of the thirteenth embodiment of the present invention.
Figure 24:
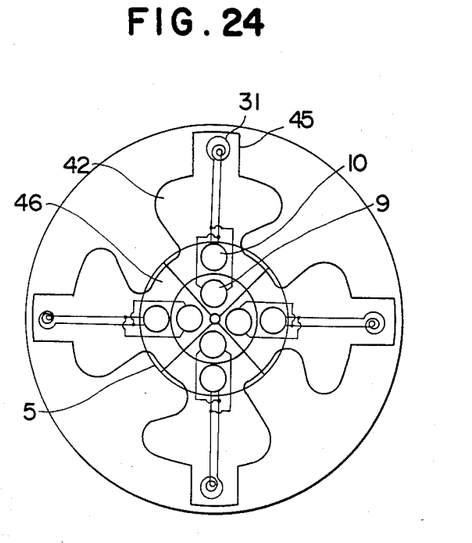
FIG. 24 is a front elevational view of the thirteenth embodiment of the present invention.

In the thirteenth embodiment shown in FIGS. 23 and 24, the fan 42 includes photoelectric elements 9 and 10 located on the central section 46 thereof and print coils 31 positioned on plates 45 which are formed on the tips of the fan blades. The frame 21 includes permanent magnets 16 located thereon at four corners and a mask section 5 formed on the frame 41 at a position opposed to the photoelectric converting elements 9 and 10 on the fan 42, the mask 5 having windows 4 as in the previous embodiments.

The ventilating fan mechanism as shown in FIGS. 19 through 24 has the following advantages:

(1) The fan mechanism is reduced in dimension without power wiring, commutator and brush.

(2) The fan mechanism can conveniently be used as a cooler for electronic instruments such as computers or the like.

(3) Even if electric power is broken down, the fan mechanism continues to operate and to prevent the heat-up of the electronic instruments.

(4) The fan mechanism can broadly be utilized in various locations such as factories, trains, domestic kitchens, toilets under the exposure of electric lights and sunlight.

In the embodiments shown in FIGS. 19 through 24, the photoelectric converting elements 9 and 10 may be replaced by elements for converting heat into electric current. Such elements may be made of copper constantan thermo-couples, bismuth, tellurium alloy, iron-silicon alloy or the like. In this case, the fan mechanism may be used for cooling an electronic instrument. If the temperature in the electronic instrument increases, the resulting heat is received by the thermionic converting means 8 to produce electric current therein. Thus, the coils 31 are energized by the electric current to produce magnetic fields which react upon the magnets 16 to rotate the fan 42. Thus, the electronic instrument can be reduced in temperature. Insulating material is used to form a mask 5 having windows 4.

Figures 25, 26:
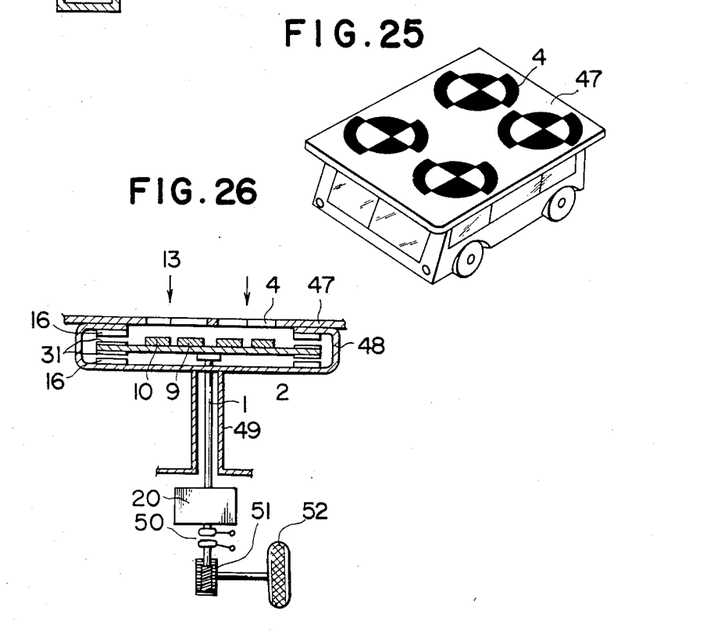
FIG. 25 is a perspective view of the fourteenth embodiment of the present invention.
FIG. 26 is a vertical cross-section of the fourteenth embodiment of the present invention.

FIG. 25 and 26 show an automobile driven when it receives the sunlight. This automobile comprises a roof plate 47 used as a mask having windows 4 as in the previous embodiments. A box-like frame 48 is fixed to the underside of the roof plate 47 and contains a rotor 2 supported by a rotating shaft 1. As in the previous embodiments, the rotor 2 comprises photoelectric converter elements 9 and 10 disposed in line with the windows 4, and print coils 31 connected with the respective elements 9 and 10. The frame 48 includes permanent magnets 16 co-operating with the print coils 31. The rotor shaft 1 extends through a pipe 49 to a fly wheel 20 for accumulating rotational energy. When a clutch 50 is engaged, drive wheels 51 are rotated by the rotation of the fly wheel 20 through gearing 51. The windows are preferably covered by sheet glass.

The automobile shown in FIGS. 25 and 26 has the following advantages:

(1) The motor is reduced in dimension and may be mounted on the roof of the automobile. Therefore, the automobile will be increased in space and reduced in weight.

(2) The automobile may be driven only by the sunlight.

(3) If the fly wheel is always rotated to accumulate rotational energy when the automobile is running on a slope or stopped, the accumulated energy can be utilized on the next start.

Figures 27, 28, 29:
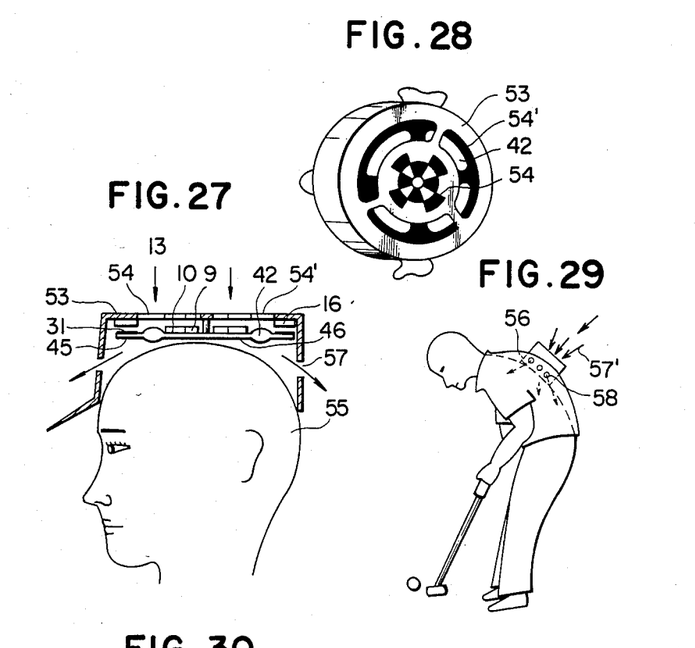
FIG. 27 is a vertical cross-section of the fifteenth embodiment of the present invention.
FIG. 28 is a top view of the fifteenth embodiment of the present invention.
FIG. 29 is a side view of the sixteenth embodiment of the present invention.

FIGS. 27 and 28 show the fifteenth embodiment of the present invention which is applied to a headgear for cooling the head of a user. The head gear comprises a top plate 53 used as a similar mask having windows 54. The top plate 53 rotatably supports the central section 46 of a fan 42. The central fan section 46 carries photoelectric converting elements 9 and 10 as in the previous embodiments. The fan 42 includes plates 45 on the tips of the fan blades and on which print coils 31 are disposed in the same manner as those of the previous embodiments. If the sunlight is incident on the top plate 53 of the headgear, the fan 52 is rotated in the same manner as previously described so that external air is drawn in through the windows 54' and exhausted out through openings 57 formed the side wall of the headgear. As a result, the user's head can effectively be cooled.

FIG. 29 shows the sixteenth embodiment of the present invention in which the fan system shown in FIG. 28 is provided with a skirt 56 adapted to be mounted on the garment of the user at his back. Air flow is directed to the back of the user through openings 58 formed in the skirt 58 to cool it.

Figure 30:
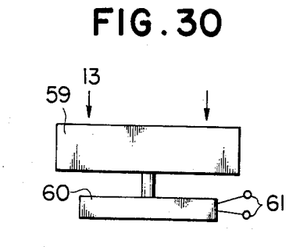
FIG. 30 is a side view of the seventeenth embodiment of the present invention.

In the seventeenth embodiment shown in FIG. 30, a motor 59 according to the present invention is connected with an AC generator 60 for generating alternating current across the output terminals 61 thereof when the generator 60 is rotated by the rotation of the motor 59.

Figure 31:
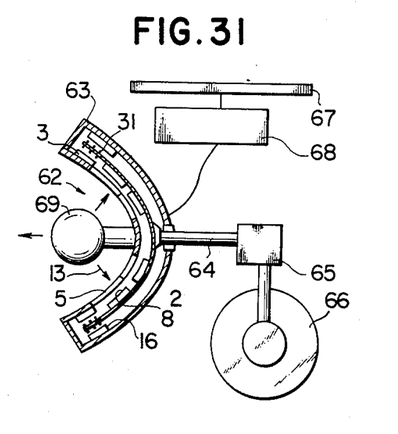
FIG. 31 is a side and partially cross-sectional view of the eighteenth embodiment of the present invention.

In the eighteenth embodiment shown in FIG. 31, a motor 63 constructed according to the present invention is incorporated into the headlamp assembly 62 of an automobile. The motor 63 has its rotating shaft 64 connected with a drive wheel 66 through a gearing 65. The automobile includes a photoelectric cell 67 mounted on the roof thereof. The photoelectric cell 67 is adapted to supply electric power to a battery 68 if the cell 67 receives the sunlight. If the bulb 69 of the headlamp is lighted on by the electric current from the battery 68, the light 13 from the bulb 69 is directed to the photoelectric converting means 8 on a rotor 2 through the windows formed in the reflector 5 which also functions as a mask. The resulting output of the photoelectric converting means 8 is supplied to print coils 31 to produce magnetic fields. Under the reaction of the magnetic fields with magnets 16 on a stator 3, the rotor 2 and thus the shaft 64 are rotated in the same manner as previously described.

Figure 32:
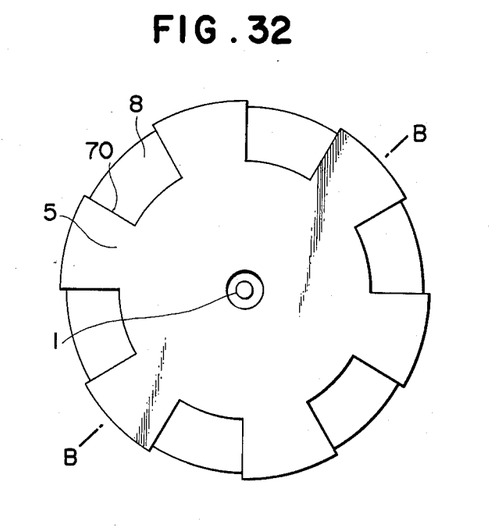
FIG. 32 is a plan view of the nineteenth embodiment of the present invention.
Figure 33:
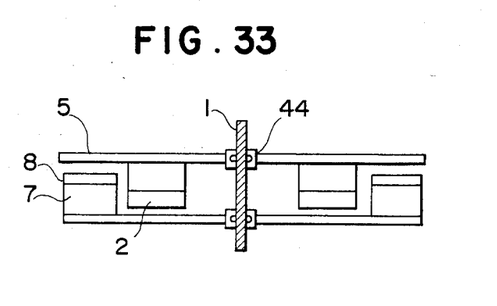
FIG. 33 is a cross-sectional view of the nineteenth embodiment, taken along a line B—B in FIG. 32.

In the nineteenth embodiments shown in FIGS. 32 and 33, a mask 5 is in the form of a circular disc which includes notches 70 formed therein at the outer periphery thereof and spaced away from one another at equidistance along the circumference of the disc. The mask 5 comprises permanent magnets disposed on the underside thereof in a ring to form a rotor 2. The rotor 2 includes a rotating shaft 1 supported by bearings 44. Another disc there are located coils 7 and photoelectric converting means 8 electrically connected with the respective coils 7 to form a stator. The coils 7 and converting means 8 co-operate with the permanent magnets on the rotor 2. Thus, if a light is incident on the respective photoelectric converting means 8 through the notches 70 of the mask 5, the rotor 2 is rotated in the same manner as previously described.

Figure 34:
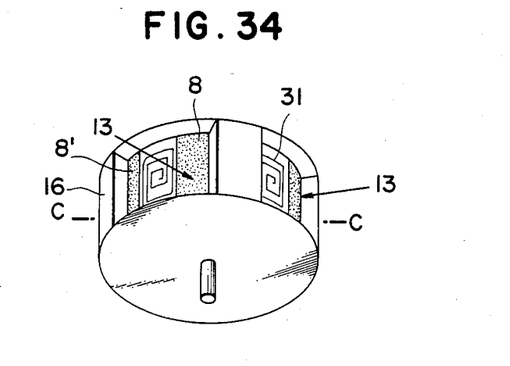
FIG. 34 is a perspective view of the twentieth embodiment of the present invention.
Figure 35:
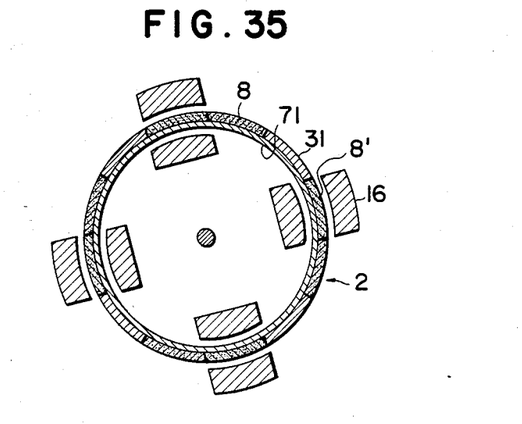
FIG. 35 is a cross-sectional view of the twentieth embodiment, taken along in a line C—C in FIG. 34.

FIGS. 34 and 35 show a motor according to the present invention in which can be energized with a light when it is received by the sides of the motor. The motor comprises a cylindrical frame 71 including print coils 31 located on the side along the circumference of the frame and spaced away from one another. Each of the print coils 31 is disposed between a pair of photoelectric converters 8 and 8' electrically connected with the corresponding print coil 31 and having the opposite polarities. The print coils 31 and converters 8 and 8' define a rotor 2. Permanent magnets 16 are disposed on the opposite sides of the wall of the frame 71 and spaced away from one another at equi-distance around the frame 71. If either of the photoelectric converter 8 or 8' is covered by one of the permanent magnets 16, the rotor can be rotated independently of the direction in which the light is incident on that converter.

Figure 36:
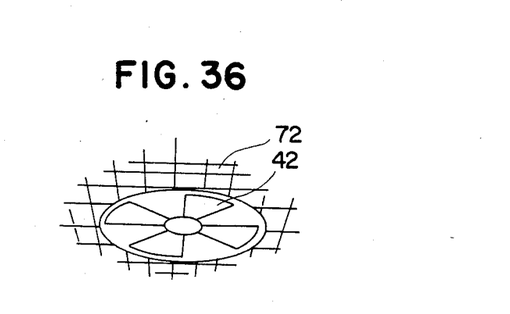
FIG. 36 is a perspective view of the twenty-first embodiment of the present invention.

FIG. 36 shows a ventilating apparatus including such a fan 42 as shown in FIG. 20 and being mounted on a ceiling 72.

I claim:

1. An apparatus for converting radiant energy such as light or heat directly into a turning force, comprising a rotor, a stator, photoelectric converting means comprising a pair of photoelectric converting elements on one of the rotor and stator for converting radiant energy such as light or heat into electric energy, each of said pair of elements having opposite polarities, said photoelectric converting means comprising windows for exposing said elements to said radiant energy, coil means on one of the rotor and stator, connecting means electrically connecting said coil means to said pair of elements, said coil means being operable to produce a magnetic field when the coil means receives the electric energy produced due to said radiant energy without need of any brush means, said two elements being alternately exposed to said windows so as to pass the electrical energy to said coil means alternately in opposite directions, and magnet means on the other of the rotor and stator for providing a turning force in response to the magnetic field in said coil means.

2. An apparatus as defined in claim 1 wherein said stator is in the form of a cylindrical casing, said magnet means including permanent magnets disposed on the inner wall of said cylindrical casing and spaced away from one another at equi-distance along the circumference of said casing, and said rotor includes corresponding arms having their tip spaced away from the permanent magnets, said coil means being mounted on the tip of the respective arms, said photoelectric converter elements being mounted on the respective arms of said rotor.

3. An apparatus as defined in claim 1 wherein said stator is in the form of a stationary member having a plurality of arms, each of said arms including a tip made of permanent magnetic material and having alternately different poles, said motor being a cylindrical member disposed around said stator and including a corresponding number of coil means mounted on the inner wall of the rotor and spaced away from one another at equi-distance along the circumference of said rotor, said photoelectric converting elements being mounted on said cylindrical member.

4. An apparatus as defined in claim 1 wherein said rotor is in the form of a disc supported by a rotatable shaft, said elements being disposed on a plurality of plates axially extending from said disc at one side, said disc including said coil means mounted on the opposite side thereof, said magnet means being in the form of a permanent magnet fixedly located adjacent said coil means.

5. An apparatus as defined in claim 1 wherein said rotor is in the form of a fan having a plurality of blades, said coil means and converting means being located on each of said fan blades, said magnet means being disposed opposed to said coil means.

6. An apparatus as defined in claim 1 wherein said stator carries said coil means and said photoelectric converter means and wherein said rotor includes said magnet means.

7. An apparatus as defined in claim 1 wherein said rotor is rotatably supported by said stator, said rotor carrying said coil means and said photoelectric converter means, said stator including said magnet means.

8. An apparatus as defined in claim 1 wherein said apparatus is incorporated into an automobile, said rotor being operatively connected with the drive wheel means in said automobile, said photoelectric converter means being disposed on the roof of said automobile.

9. An apparatus as defined in claim 1 wherein said apparatus is incorporated into the headlamp assembly of an automobile, said rotor being operatively connected with the drive wheel means of said automobile, said photoelectric converter means being adapted to receive light from the turned-on bulb of said headlamp which is electrically connected with a battery, said battery being charged by another photoelectric converter which is mounted on the roof of said automobile.

10. An apparatus as defined in claim 1 wherein said apparatus includes an output shaft connected with a fly wheel.

11. An apparatus as defined in claim 1 wherein said apparatus includes an output shaft connected with an AC generator.

12. An apparatus as defined in claim 1 wherein said rotor is in the form of a cylindrical member, the outer sidewall of said cylindrical member carrying said photoelectric converting means and said coil means, said photoelectric converting means including plural sets of two photoelectric converter elements having different in polarity from each other and disposed along the circumference of said cylindrical member, one of said coil means being located between two photoelectric converting elements in each set.

13. An apparatus for converting radiant energy such as light or heat directly into a moving force, comprising a traveling body, a casing having rails on which said traveling body travels, said traveling body including a pair of photoelectric converter means having different polarities, said converter means being adapted to be alternately exposed to light, said traveling body further including coil means electrically connected with said photoelectric converter means, another set of spaced coil means disposed along said casing and cooperable with said coil means on said traveling body, and another set of photoelectric converter means on said casing, said other set of spaced coil means being always energized by electric current from said other set of photoelectric converter means, whereby said traveling body travels along said rails by the moving force obtained from said radiant energy.

14. An apparatus for converting radiant energy such as light or heat directly into a turning force, comprising a casing, rotor rotatable mounted in said casing, a stator disposed in said casing, photoelectric converting means comprising a pair of photoelectric converting elements on one of the rotor and stator for converting radiant energy such as light or heat into electric energy, each of said pair of elements having opposite polarities, each of said elements being radially aligned, said casing having window means comprising a pair of radially spaced windows, one of said pair of windows being disposed to expose one of said pair of elements to the outside of said casing so that light passes through said one window onto said element, the other of said pair of windows being disposed to expose the other of said pair of elements to the outside of said casing so that light passes through said other window onto said other element, coil means on the one of the rotor and stator, connecting means connecting said coil means to said pair of elements, said coil means being operable to produce a magnetic field when the coil means receives the electrical energy produced due to said radiant energy without the need of any brush means, said two windows being circumferentially spaced from one another such that said one window exposes said one element during part of one revolution of said rotor to thereby pass said electrical energy to said coil means in one direction and said other window exposes said other element during another part of said one revolution of said rotor to thereby pass said electrical energy to said coil means in a direction opposite to said one direction, and magnet means on the other of the rotor and stator for providing a turning force in response to the magnetic field in said coil means.

15. An apparatus according to claim 14, wherein said pair of elements are radially spaced from one another.

16. An apparatus according to claim 14, wherein said pair of windows are radially spaced from one another.

17. An apparatus according to claim 14, wherein said photoconverting means comprises a second pair of photoelectric converting elements, each of said second pair of elements being radially spaced from one another, one of said elements of said second pair of elements being spaced from the center of rotation of said rotor the same distance as said one element of the first said pair of elements, another of said elements of said second pair of elements being spaced from the center of rotation of said rotor the same distance that said other element of the first said pair of elements is spaced from the center of rotation of said rotor.

18. An apparatus according to claim 14, wherein said window means comprises a second pair of windows, each of said second pair of windows being radially spaced from one another, one of said windows of said second pair of windows being spaced from the center of rotation of said rotor the same distance as said one window of the first said pair of windows, another of said windows of said second pair of windows being spaced from the center of rotation of said rotor the same distance that said other window of the first said pair of windows is spaced from the center of said rotor.

19. An apparatus according to claim 18, wherein each of said windows extends over a nineth-degree arc.

* * * * *